United States Patent [19]
Carton et al.

[11] Patent Number: 4,788,876
[45] Date of Patent: Dec. 6, 1988

[54] DEVICE FOR CONTROLLING TRANSMISSION DOG CLUTCHES

[75] Inventors: Georges Carton, Corbas; Philippe Bernaud, Lyon; Jean-Louis Rauffer, La Verpilliere; Yves Drutel, Brignais, all of France

[73] Assignee: Renault Vehicules Industriels, Lyon, France

[21] Appl. No.: 43,447

[22] Filed: Apr. 28, 1987

[30] Foreign Application Priority Data

May 6, 1986 [FR] France ................................ 86 06509

[51] Int. Cl.[4] .......................... F16H 5/04; B60K 20/10
[52] U.S. Cl. ................................... 74/335; 74/473 R
[58] Field of Search ........................... 74/473 R, 335

[56] References Cited

U.S. PATENT DOCUMENTS 2,931,237  4/1960  Backus .................................. 74/335
4,580,457  4/1986  Ishida et al. ........................ 74/473 R

FOREIGN PATENT DOCUMENTS 149020    7/1985  European Pat. Off. .......... 74/473 R
61-45142  3/1986  Japan ................................. 74/473 R
28234    of 1908  United Kingdom ............. 74/473 R

OTHER PUBLICATIONS

Industrial Hydraulic Technology Bulletin 0221-B1, Apr., 1985, pp. 8-4 to 8-5, Library No. TJ 840.H8 P31.

Primary Examiner—Lawrence Staab
Attorney, Agent, or Firm—Oblon, Fisher, Spivak, McClelland & Maier

[57] ABSTRACT

Device for controlling transmission dog clutches, has a single actuator (1) having at least one control pin (2, 3) which cooperates with control forks (4) having two positions, one of these positions corresponding to a clutching and the other position corresponding to a declutching. The actuator (1) can translate or rotate.

6 Claims, 1 Drawing Sheet

DEVICE FOR CONTROLLING TRANSMISSION DOG CLUTCHES

BACKGROUND OF THE INVENTION

This invention relates to a device for controlling motor vehicle transmission dog clutches.

Numerous control devices are known which have a cylinder for each dog clutch. These systems require indicators and position readers for each of the dog clutches, with a large number of electrical connections. Moreover, these designs result in complex units which exhibit a considerable bulk and which are difficult to make.

SUMMARY OF THE INVENTION

The object of this invention is to propose a control device particularly for transmission dog clutches that uses to a single set of cylinders for the control of all the dog clutches of a transmission, to limit the necessary adjustments and the bulk of the device.

According to an embodiment of the invention, the device for controlling transmission dog clutches has a single actuator which has at least one control pin, which cooperates with control forks having two positions. One of these positions corresponds to a clutching, and the other position corresponds to a declutching. The actuator is equipped with translation means and rotation means.

According to an embodiment of the invention, the single actuator has two control pins, which are located in relation to one another in a diametrically opposite zone.

According to an embodiment of the invention, the translation means consist of a double-acting translation cylinder whose body carries the control pins, and each of whose feed ducts is equipped with a solenoid valve.

According to an embodiment of the invention, the rotation means consist of a double-acting rotation cylinder whose rod is unitary with a hooking arm. This hooking arm cooperates with another rod which is mounted between one of the control pins and a support unitary with the body of the translation cylinder. This rod is parallel to the axis of the translation cylinder. Each of the feed ducts of the cylinder is equipped with a solenoid valve.

According to an embodiment of the invention, each of the control forks cooperates with two holding pins; one holding pin being engaged in the slot of the corresponding control fork to indicate the clutched position, while the other holding pin indicates the declutched position.

According to an embodiment of the invention, the control of the single actuator is carried out by an electronic package.

The device for controlling transmission dog clutches according to the invention thus exhibits the advantage of reducing the number of control cylinders, which are thus reduced to two. In this way, the number of electrical connections, and of position data is also reduced. Moreover, the device according to the invention is not very bulky, and it can be easily adapted to existing transmissions without significant modifications.

BRIEF DESCRIPTION OF THE DRAWINGS

The invention will be better understood by the study of a particular embodiment, described in a way not at all limiting and illustrated by the accompanying drawings in which.

DETAILED DESCRIPTION OF THE PREFERRED EMBODIMENT

The control device according to the invention comprises essentially a single actuator 1 which drives control forks 4, each having two positions. This device applies particularly to the control of dog clutches of a transmission. In this case, each control fork 4 controls a dog clutch, and it has two positions:
one position corresponding to clutching,
and one position corresponding to declutching.

Single actuator 1 is driven by translation means and by rotation means to be able to be engaged in the selected control fork.

Figure 1:
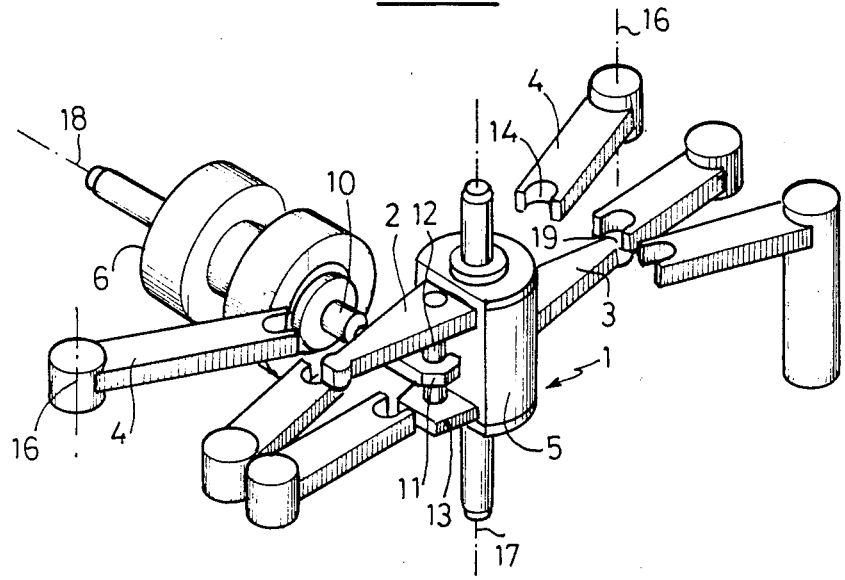
FIG. 1 is a view in perspective of the whole device according to the invention.
Figure 2:
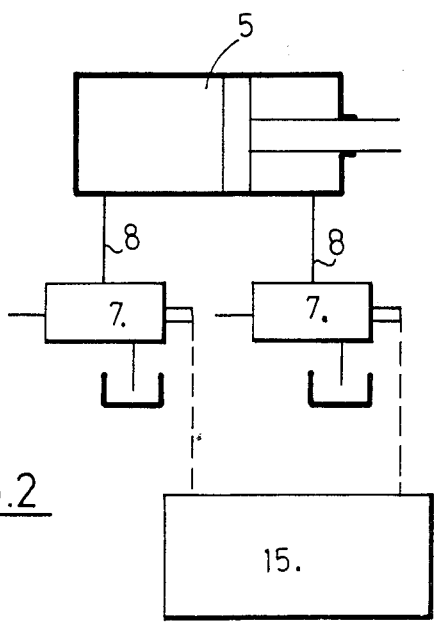
FIG. 2 is a diagram showing the feeding of one of the cylinders.

The single actuator 1 used is hinged around a pin having axis 17. The actuator can be moved in rotation in a plane which is horizontal in the case of FIG. 1, and be moved in translation along the axis 117 which is perpendicular to the preceding plane, i.e., a vertical axis in the case of FIG. 1.

Two hydraulic cylinders oriented at 90° in relation to one another make it possible to provide the two movements of the system.

The translation means consist of a double-acting translation cylinder 5 which is fed by feed ducts 8. Each feed duct 8 has a solenoid valve 7 which is connected on the one hand to a fluid feed source under pressure, and on the other hand a zero pressure return. Axis 17 of translation cylinder 5 corresponds to the vertical axis of single actuator 1.

The rotation means is identical to the translation means, i.e., it consist of a double-acting rotation cylinder 6 which is fed by feed ducts 8. Each feed duct 8 has a solenoid 7 which is connected on the one hand to a fluid feed source under pressure, and on the other hand a zero pressure return. The axis of rotation cylinder 6 is referenced 18.

Single actuator 1 consists mainly of a body which is the body of translation cylinder 5. This body carries two control pins referenced respectively 2 and 3, and which are diametrically opposite. Each control pin 2 and 3 is ended with a rounded shape 19 which makes it possible for it to be engaged easily in slot 14 in each of control forks 4, to be able to move the selected fork.

Each dog clutch is thus controlled by a control fork 4 which has two positions:
a clutched position,
and a declutched position.

Each control fork 4 is moved by rotation around an axis 16 which is the axis of rotation of the fork itself.

Rotation cylinder 6 has a rod 10 which moves along axis 18. This rod 10 is connected with a hooking arm 11 which is secured to a rod 12. This rod 12 is integral with a support 13 connected to body 9. This rod 12 is parallel to axis 17 of translation cylinder.

To move a dog clutch, corresponding control pin 2 or 3 must necessarily be engaged in slot 14 of a control fork 4, and to do this it must retract a holding pin not shown in the figures. This holding pin is a safety; it avoids any operating error, and it prevents any movement responsive to an axial thrust on the control fork 4 under consideration. Each of control forks 4 thus cooperates with one of two holding pins 2 or 3; one holding pin being engaged in slot 14 of the corresponding control fork to set the clutched position, while the other holding pin sets the declutched position of an opposing fork at that axial position, or vice-versa.

Control forks 4 of the various dog clutches are located in two horizontal planes. In the embodiment shown in FIG. 1, there are six dog clutches controlled by six forks, which are positioned with three forks in each of the horizontal planes. The axial space left free between the two control fork levels makes it possible for single actuator 1 to be moved in rotation without colliding with any of the forks.

Control of single actuator 1 is assured by an electronic package 15 which controls the two solenoid valves 7 of translation cylinder 5 and of rotation cylinder 6.

We claim:

1. In a transmission having dog clutches, each of said dog clutches having a control fork pivotable between a clutching position and a declutching position, a clutch control device comprising:

an actuator having a body;
means for translating said body along an axis parallel to pivoting axes of said control forks, wherein said control forks are in at least two axial positions relative to said axis of translation;
means for rotating said body about said axis of translation; and
at least one pin fixed to said body and having means for cooperating with each of said forks, whereby said at least one pin may translate and rotate to engage one of said control forks and may rotate to pivot said one of said forks between said clutching and declutching positions,
wherein said translation means comprise:
a double acting translation cylinder comprising said body;
hydraulic feed means for said translation cylinder; and
solenoid valve means in said hydraulic feed means.

2. The transmission of claim 1 including two said pins extending in diametrically opposite positions relative to said axis of translation.

3. The transmission of claim 2 wherein said control forks are positioned such that a control fork engaged with one of said pins is in a clutching position when a control fork engaged with another of said pins is in a declutching position.

4. The transmission of claim 1 wherein said rotation means comprise:

a double acting rotation cylinder having a cylinder rod extending transverse to said axis of translation;
a support fixed to said body;
a rod mounted between said at least one pin and said support, said rod extending parallel to said axis of translation;
a hooking arm fixed to said cylinder rod and engaged with said rod mounted between said at least one pin and said support;
hydraulic feed means for feeding said rotation cylinder; and
solenoid valve means is said hydraulic feed means for feeding said rotation cylinder.

5. The transmission of claim 4 including electric control means for controlling said solenoid valve means.

6. The transmission of claim 1 including electric control means for controlling said solenoid valve means.

* * * * *